United States Patent [19]

Hirose

[11] Patent Number: 5,275,556
[45] Date of Patent: Jan. 4, 1994

[54] HEAT RECOVERY TYPE COMBUSTION APPARATUS

[75] Inventor: Yasuo Hirose, Yokohama, Japan

[73] Assignees: Furnace Techno Co., Ltd.; Chiyoda Corp., Japan

[21] Appl. No.: 911,908

[22] Filed: Jul. 10, 1992

[30] Foreign Application Priority Data

Jul. 29, 1991 [JP] Japan ............................. 3-059434
Apr. 21, 1992 [JP] Japan ............................. 4-101191

[51] Int. Cl.$^5$ ..................... F27D 17/00; F24C 3/00
[52] U.S. Cl. ............................... 432/180; 432/181; 126/91 A
[58] Field of Search ............. 432/180, 181, 182, 223; 431/170; 126/91A

[56] References Cited

U.S. PATENT DOCUMENTS

| 3,077,926 | 2/1963 | Fikenscher . | |
|---|---|---|---|
| 4,512,266 | 4/1985 | Shigaki . | |
| 4,604,051 | 8/1986 | Davies et al. | 432/181 |
| 4,856,492 | 8/1989 | Kawamoto | 126/91 A |
| 4,926,842 | 5/1990 | Watson et al. | 126/91 A |

FOREIGN PATENT DOCUMENTS

| 2624874 | 12/1977 | Fed. Rep. of Germany . |
| 4013484 | 10/1990 | Fed. Rep. of Germany . |
| 58-158415 | 12/1983 | Japan . |
| 222102 | 9/1989 | Japan . |
| 2208423 | 3/1989 | United Kingdom . |

OTHER PUBLICATIONS

Ishikawajima Harima Technical Report, Sep. 1975.

Primary Examiner—Henry C. Yuen
Attorney, Agent, or Firm—Connolly & Hutz

[57] ABSTRACT

This invention is directed to a heat recovery type combustion apparatus which has a regeverative member of ceramic material attached to the lateral wall of the main body of the combustion apparatus, a rotary duct set in place and adapted to communicate with the regeverative member, an air conduit for allowing flow of combustion air and an exhaust gas conduit for allowing flow of exhaust gas arising from combustion of fuel in the combustion apparatus both formed in the interior of the rotary duct, and rotary means adapted to rotate the rotary duct and enable the combustion air to be heated with the exhaust gas through the medium of the regeverative member.

12 Claims, 8 Drawing Sheets

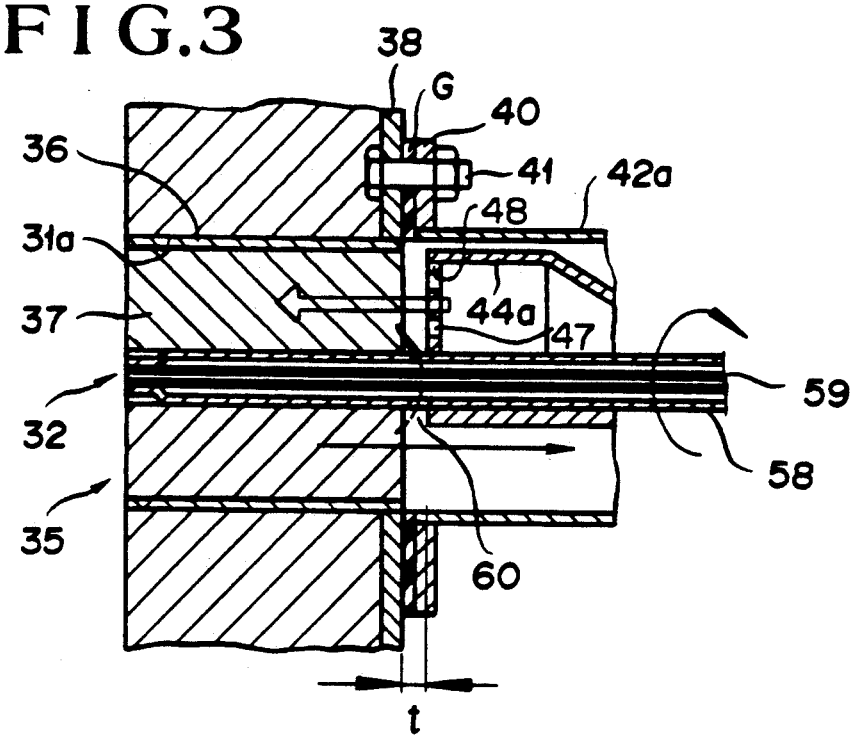
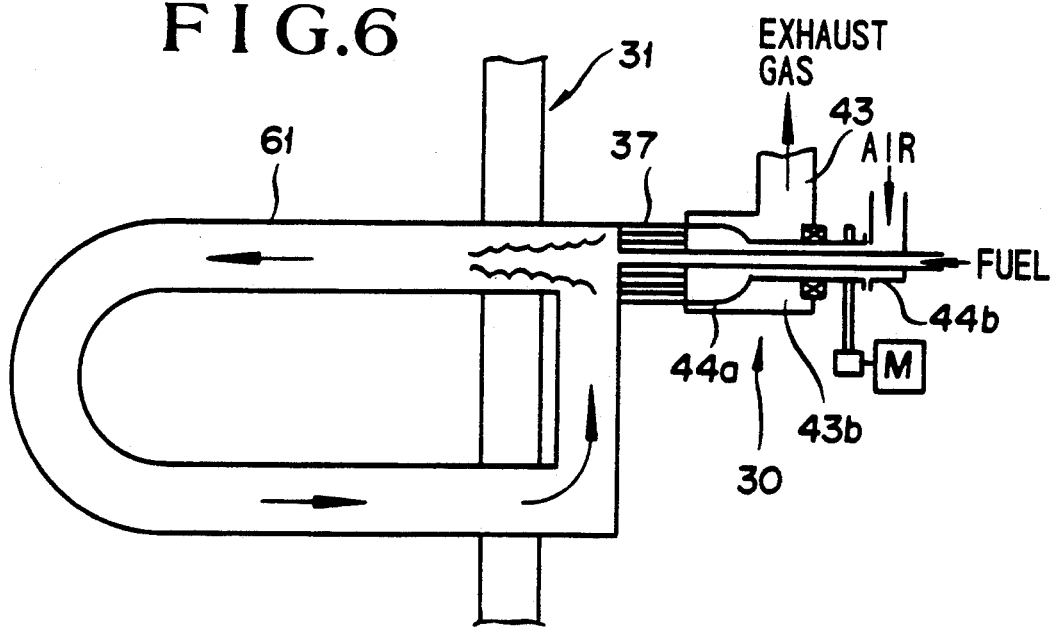

RELATION BETWEEN REVOLUTION NUMBER AND TEMPERATURE

HEAT RECOVERY TYPE COMBUSTION APPARATUS

BACKGROUND OF THE INVENTION

1. Field of the Invention

This invention relates to a heat recovery type combustion apparatus which is configured to utilize the heat of exhaust gas arising from combustion for heating the air to be used for combustion.

2. Description of the Prior Art

In the combustion apparatuses which are used in such industry grade furnaces as forging furnaces, normalizing furnaces, and refining furnaces and such steam-generation purpose heating apparatus for turbines, the heat recovery type combustion apparatuses which are configured to utilize the heat of exhaust gas emanating from combustion for heating the air to be used for the combustion have been enjoying prevalent acceptance.

The recuperator which is used in these combustion apparatuses is generally provided with a specific heat exchanger interposed between an exhaust gas line and a combustion air line which are closely disposed to each other and, therefore,, is enabled to exchange heat between the air and the exhaust gas flowing through the two lines and utilize the heat of the exhaust gas resulting from combustion for heating the air to be used for the combustion. The heat which is recovered by means of this recuperator is about 50% in point of temperature level. In the case of an industry grade furnace which gives rise to exhaust gas of a temperature of 1,200 C., for example, the combustion air which has exchanged heat with the exhaust gas has a temperature of about 600 C.

The recuperterator is heavily restricted in point of not only material for the construction thereof but also space for the installation thereof. It possibly occupies more floor space than the main body of a furnace or a heating apparatus.

Recently, the present inventor has proposed a combustion apparatus (Japanese Unexamined Patent Publication No. 222,102/1989) which is configured as illustrated in FIGS. 9 and 10.

This combustion apparatus 100 is provided with a burner 112 for heating a substance W subjected to the heating inside the main body R of a furnace. In the wall of the furnace near the burner 112 is disposed a regenerative member 122 made of an air-pervious ceramic material, with a cylindrical shape and to be partitioned to the pattern of a honeycomb. This regeverative member 122 absorbs the heat of the hot exhaust gas when this exhaust gas is discharged from within the main body R and allows this heat for heating the combustion air which is passing through an air conduit 119. The supply of the heat to the combustion air is continued by causing the regeverative member 122 by a motor M through the medium of a rotary shaft 123.

However, since this combustion apparatus 100 must rotate the regeverative member 122 exposed to the interior of the main body R which is destined to rise to a high temperature, it is required either to interpose between the rotary shaft 123 and the motor M heat-insulating means capable of intercepting the heat transmitted from the regeverative member 122 via the rotary shaft 123 to the motor M or to set the motor M at a position so distant as to disrupt the thermal effect of the regeverative member 122. The provision of these means adds to the size of the combustion apparatus 100 or complicates the whole configuration thereof.

Further, the regeverative member 122 of this combustion apparatus 100 remains at an elevated temperature while in service and at a low temperature while out of service and alternates expansion and shrinkage in spite of the ceramic material thereof. When the regeverative member made of the ceramic material which alternates expansion and shrinkage as described above must be rotated, it is allowed a desired increase in size only with difficulty. A combustion apparatus with a large capacity for combustion which consumes the combustion air and discharges the exhaust gas both in huge volumes, therefore, is not easily attained.

Further, the regeverative apparatus which alternates expansion and shrinkage and, at the same time, rotates renders it difficult to set the burner in place at the center thereof. It, therefore, has the disadvantage in that the burner and the air conduit are separated from each other, the flexibility with which the size, sharpness, etc. of a flame emitted from the burner are controlled is degraded, and the capacity for control or versatility dwindles. Though various electrical control devices may be used for the purpose of improving the controllability of the burner, for example, the use of these devices is not desirable because they increase the cost of the apparatus as a whole.

SUMMARY OF THE INVENTION

This invention has been perfected for the solution of the problems which are entailed by the prior techniques as described above. The first object of this invention is to provide a heat recovery type combustion apparatus which is capable of enhancing the intensity of fire and the temperature of combustion, simple in construction, rich in flexibility of the formation of flame, able to allow addition to size, effective in saving energy and ensuring safety of operation, and long in service life.

The second object of this invention is to provide an ash-dissolving furnace which heightens the temperature of the combustion air to a level beyond the upper limit attainable by the conventional heat exchanger to heighten the temperature of combustion enough to dissolve ash and, at the same time, coat the inner wall of the furnace with the dissolved ash, and attain prevention of the furnace from loss by fusion.

To accomplish the first object, this invention is directed to a heat recovery type combustion apparatus comprising a burner for heating a substance held inside the main body of the combustion apparatus and subjected to heating, an air conduit adapted to allow flow of combustion air through the interior thereof and laid in the proximity of the burner, an exhaust gas conduit for discharging exhaust gas arising from combustion from the main body of the combustion apparatus, and a heat-exchange member for causing the heat of the exhaust gas to heat the combustion air flowing through the air conduit, which combustion apparatus is characterized in that the heat-exchange member is formed of a ceramic air-pervious regeverative member, the regeverative member is attached to the lateral wall of the main body of the combustion apparatus, a main body case disposed so as to communicate with the regeverative member is provided therein with a rotary duct, the air conduit and the exhaust gas conduit separate from each other throughout the entire length from the inlet to the outlet thereof are formed inside the rotary duct, a fuel pipe for supplying fuel to the burner disposed substantially at the central position of the regeverative member is laid through the rotary duct, and the rotary duct is rotated by rotary means and consequently enabled to advance the combustion air from the air conduit via the regeverative member to the main body of the combustion apparatus and the exhaust gas through the regeverative member to the exhaust gas conduit.

The rotary duct is desired to be disposed so that the air conduit and the exhaust gas conduit may be positioned alternately in the circumferential direction. The air duct is desired to have the leading terminal thereof closed with an end plate containing numerous small holes. The rotary duct is desired to allow a prescribed gap to intervene between itself and the regeverative member. It is desired to be provided with an air pipe for supplying motive air to the center of the fuel pipe. The main body of the combustion furnace may concurrently serve as the body of an ash-dissolving furnace. In this case, the main body of the combustion apparatus is desired to be provided with cooling means capable of spouting a fluid of relatively low temperature in the form of film on the lateral terminal face of the furnace body of the regeverative member.

While the combustion apparatus constructed as described above is in service, the regeverative member is heated by the radiant heat arising from combustion and the hot exhaust gas flowing through the exhaust gas conduit. While the apparatus is out of service, the regeverative member is left cooling. Since the regeverative member is fixed to the main body of the combustion apparatus, it poses no problem even when it is formed in a relatively large size. It is enabled to acquire a high capacity for combustion with a simple construction.

By rotating the passing air side, namely the side of the air conduit and the exhaust gas conduit, instead of rotating the regeverative member, the combustion air flowing out of the air conduit is heated while flowing through the interior of the regeverative member in a heated state and the hot exhaust gas flowing through the exhaust gas conduit heats the regeverative member. Even when the combustion air cools the regeverative member, it does not suffer any decrease of temperature because it is led to the increasingly hot parts of the regeverative member by the rotation of the duct. The operation of combustion which is effected with the hot combustion air proceeds in the region of extremely high temperature and the interval between the time the combustion is started and the time the prescribed elevated temperature is reached is shortened.

By closing the leading terminal of the air conduit with an end plate containing numerous small holes and discharging the high speed air from the air conduit in the direction of the regeverative member, the amount of the exhuast gas suffered to leak between the regeverative member and the rotary duct can be restrained.

Further, since the burner is disposed substantially in the central position of the regeverative member, the combustion air during the process of combustion is blown out in the direction of the periphery of the flame formed by the burner and enabled to regulate the upward displacement of the flame radiated from the burner and, at the same time, promote complete combustion of the fuel. The prescribed gap to be interposed between the rotary duct and the regeverative member causes the exhaust gas arising from combustion to be recirculated and enables the amount of discharged NOx to be lowered or controlled.

Moreover, the supply of motive air to the air pipe in the fuel pipe allows adjustment of the size or sharpness of the flame radiated from the burner, increases the flexibility of the flame, and enhances the controllability or versatility of the apparatus.

When this invention is embodied in an ash-dissolving furnace, since the combustion air is heated by the use of the regeverative member which in turn is heated with the exhaust gas, the high temperature enough to dissolve even the ash to be produced in consequence of combustion of flame retardant fuel can be secured with ease. The ash-dissolving furnace, therefore, effects dissolution of the ash and coats the inner wall of the furnace with a solidified crust of dissolved ash and consequently prevents the furnace from loss by fusion. This furnace allows flame retardant fuel to be used as ordinary fuel. The exhaust gas can be reclaimed as a fuel of low calory.

BRIEF DESCRIPTION OF THE DRAWINGS

FIG. 3 is a detailed diagram illustrating the essential part of the apparatus of FIG. 1.

FIG. 6 is a schematic cross section illustrating another embodiment of this invention.

DETAILED DESCRIPTION OF THE PREFERRED EMBODIMENT

Now, this invention will be described below with reference to the drawings illustrating embodiments of this invention.

Figure 1:
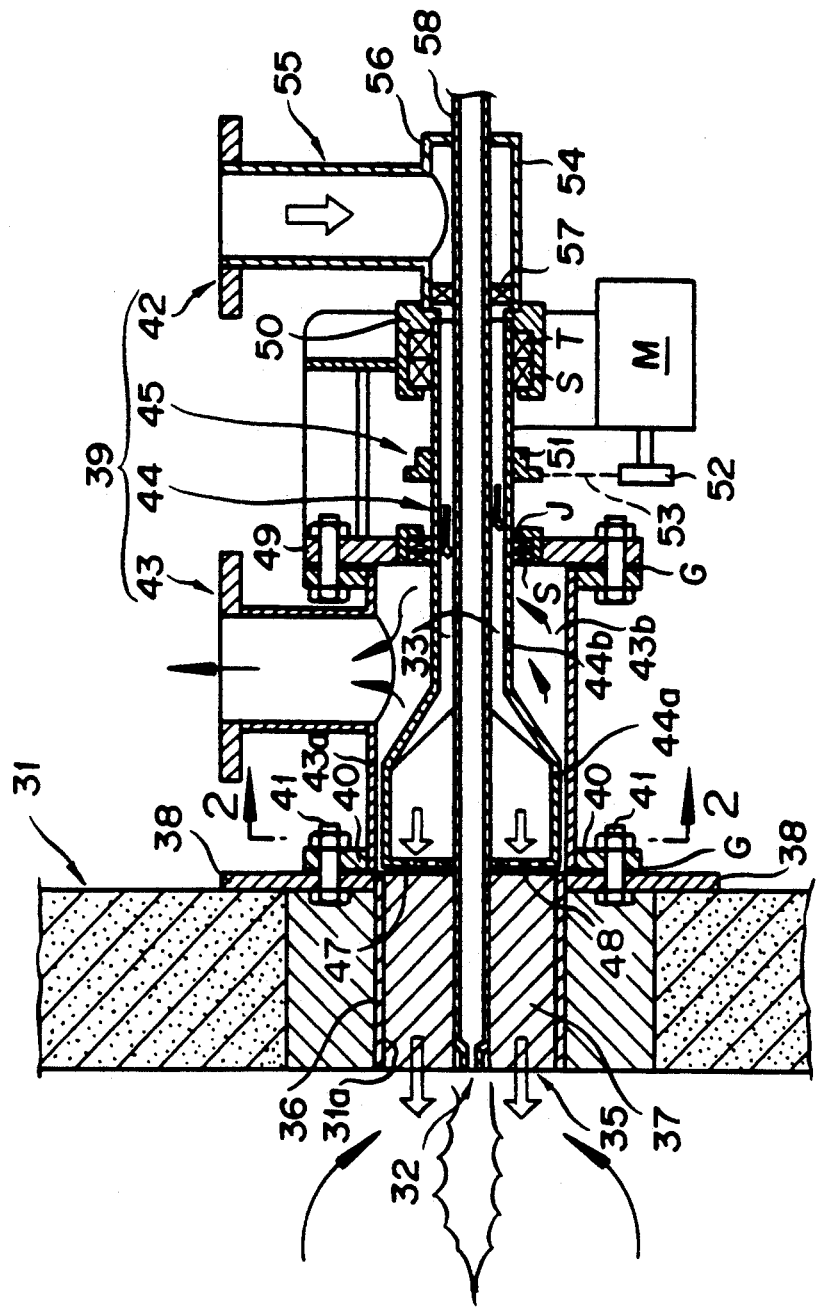
FIG. 1 is a schematic cross section of a heat recovery type combustion apparatus as one embodiment of this invention.

In FIG. 1, a heat recovery type combustion apparatus 30 is attached to the lower part of the main body 31 of combustion apparatus formed of a forging furnace and is used as a heat source for heating a substance such as ingot placed inside the main body 31 and subjected to heating.

The heat recovery type combustion apparatus 30 is provided with a burner 32 for radiating flame in the direction of the substance placed inside the main body 31 and subjected to combuation, an air conduit 33 disposed in the proximity of the burner 32 and adapted to allow flow of combustion air in the interior thereof, an exhaust gas conduit 34 (FIG. 2) disposed in the proximity of the air conduit 33 and adapted to discharge exhaust gas arising from combustion out of the interior of the main body 31, and a heat-exchange member 35 capable of transmitting the heat of the exhaust gas to the combustion air flowing through the air conduit 33.

The main body 31 of combustion apparatus is made of a refractory material such as refractory bricks. It has an opening 31a formed in the lateral wall thereof. The heat-exchange member 35 mentioned above is set in place inside this opening 31a. This heat-exchange member 35 is formed of an air-pervious regeverative member 37 made of a ceramic substance and shaped after a honeycomb. The regeverative member 37 is supported by a mortar 36 interposed between itself and the opening 31a. At the center of the regeverative member 37 is disposed the burner 32 the leading terminal of which is exposed inside the main body 31 of combustion apparatus. This burner 32 is an ordinary gas or oil burner. The combustion air from the air conduit 33 is spouted through the regeverative member 37 which encircles the burner 32. Since the combustion air is spouted through the periphery of the burner 32, there is derived a secondary effect of precluding the upward displacement of the flame of the burner 32 by the combustion air itself.

A plate 38 for supporting the burner 32 is formed along the outer edge of the opening 31a. To this plate 38, a flange 40 of a main body case 39 is connected with bolts 41 through the medium of a gasket G so as to establish communication between the main body case 39 and the regeverative member 37.

The main body case 39 is provided with an air inlet part 42 for introducing combustion air by means of a blower, for example, an outlet part 43 for discharging exhaust gas from the interior of the case, a rotary duct 44 interposed between the air inlet part 42 and the regeverative member 37, and a driving means 45 for rotating the rotary duct 44.

Figure 2:
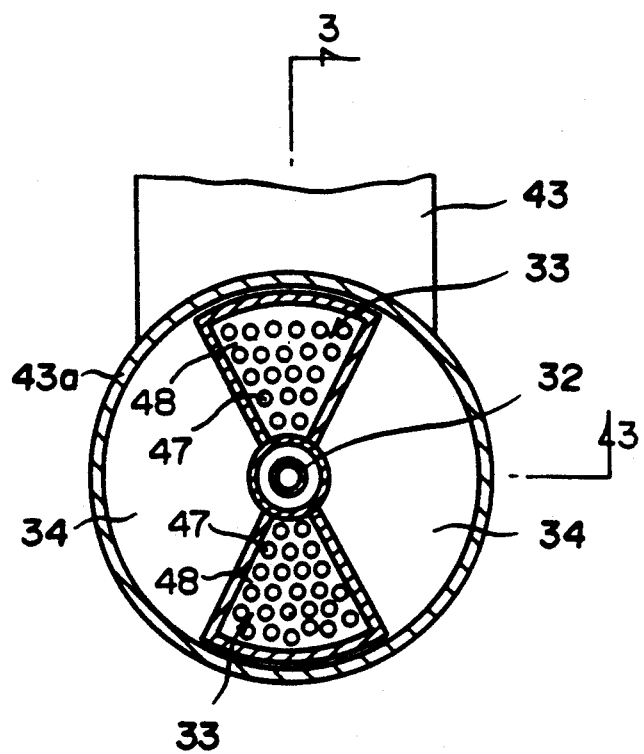
FIG. 2 is a cross section taken through FIG. 1 along the line 2—2.
Figure 4:
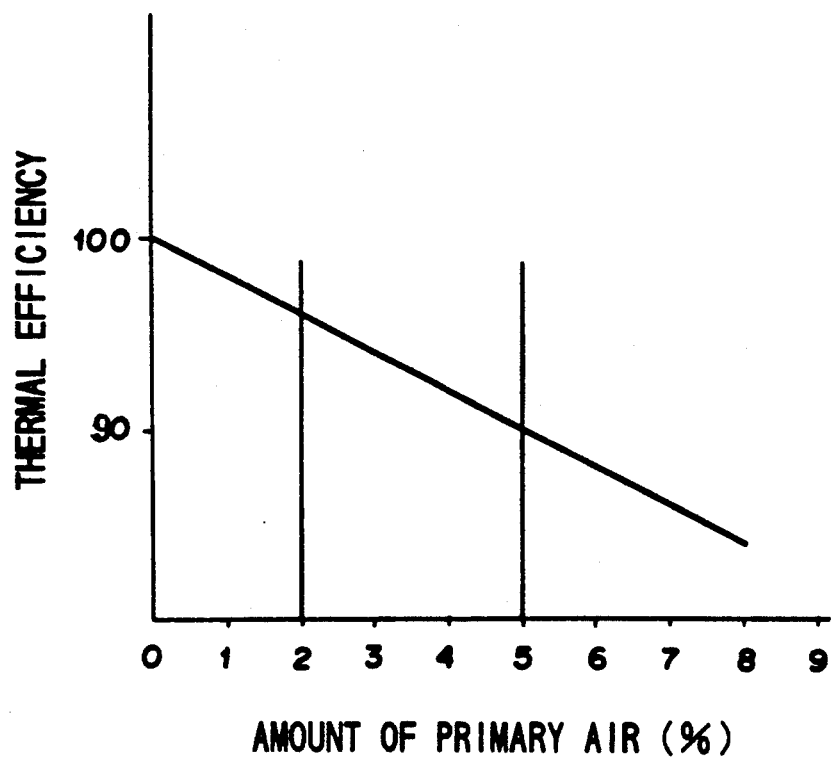
FIG. 4 is a diagram illustrating the characteristics of control of the amount of motive air.

In a body 43a of the outlet part 43, a large diameter part 44a of the rotary duct 44 is set in place. This large diameter part 44a is part of the air conduit 33 and has a cross section of the shape of an acute sector as illustrated in FIG. 2. Inside the body 43a, the air conduit 33 and the exhaust gas conduit 34 are positioned so as to alternate in the circumferential direction. The large diameter part 44a having the shape of an acute sector constitutes itself the air conduit 33 and the part so formed as to have a cross section of the shape of an acute sector serves as the exhaust gas conduit 34.

These air conduit 33 and exhaust gas conduit 34 are shaped so as to form two separate passages throughout the entire length from the inlet to the outlet. To be specific, the air conduit 33 is so adapted that the air flowing in through the air inlet part 42 is passed through the rotary duct 44 gradually flaring from a small diameter part 44b to the large diameter part 44a and is discharged in the direction of the regeverative member 37. Especially the air conduit 33 in the present embodiment has the regeverative member 37 side leading terminal thereof closed with an end plate 48 containing numerous small holes 47 so that the combustion air on being discharged through the small holes 47 converts to a flow of high speed and, by virtue of the ensuant Venturi effect, draws into the air conduit 33 the exhaust gas liable to leak between the regeverative member 37 and the rotary duct 44 and restrains the amount of exhaust gas suffered to leak.

The exhaust gas conduit 34 is so adapted that the exhaust gas discharged from the regeverative member 37 is passed through the part having a cross section of the shape of an acute sector and led to an inner empty space 43b of the body 43a in the outlet part 43.

The driving means 45 rotatably supports the rotary duct 44 with seal members S and bearings J disposed respectively in the inner terminal part of a closing plate 49 set in place so as to close the counter-regeverative member side terminal part of the body 43a in the outer part 43 and the inner terminal part of a supporting plate 50 set in place in the right terminal part of the small diameter part 44b in the rotary duct 44 and connects through the medium of a chain 53 a sprocket 51 fixed between the two bearings J and J and a drive gear 52 rotated by a motor M.

In this embodiment, since the rotary duct 44 is supported in an ideally balanced state with the two bearings J and J as described above, it can be rotated at a relatively high speed and the thermal efficiency of the furnace can be improved by increasing the speed of rotation.

Figure 5:
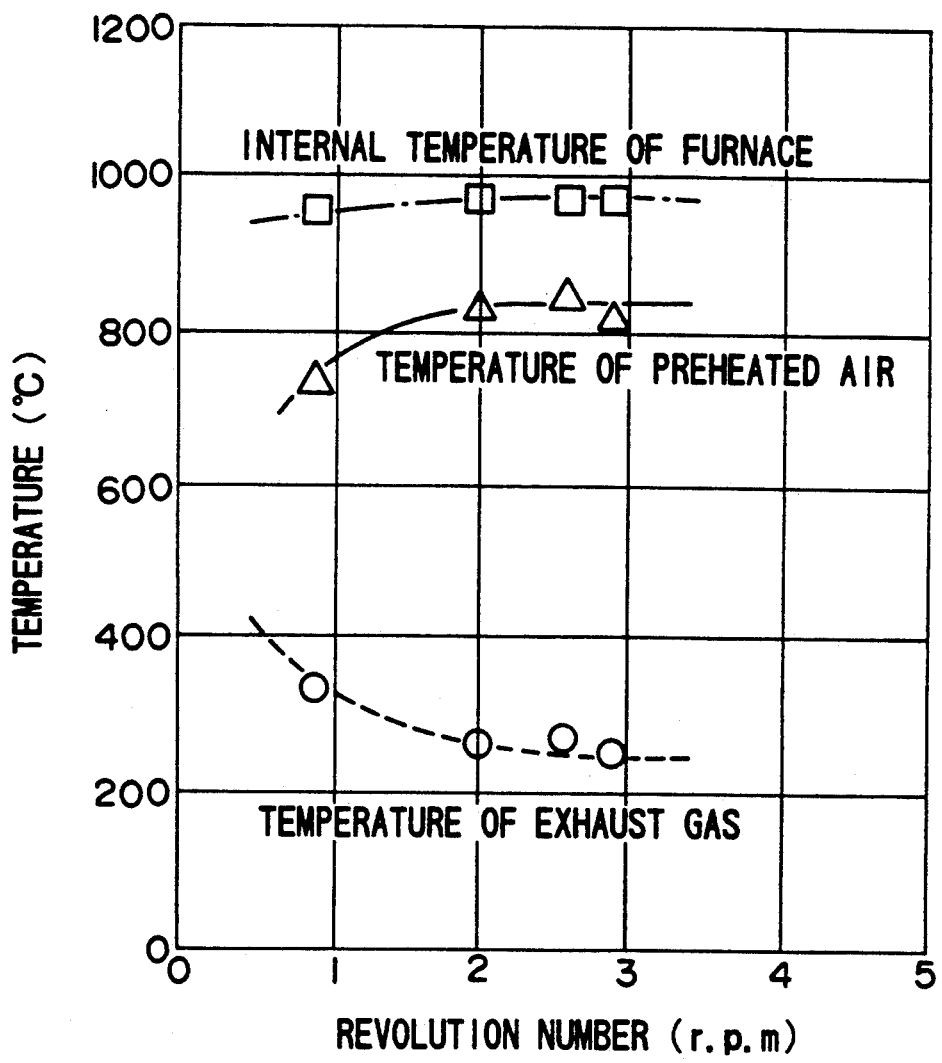
FIG. 5 is a graph showing the results of test obtained of this invention.

An experiment was performed to determine the relation between the speed of rotation of the rotary duct 44 and the thermal efficiency of the furnace. The results are shown in FIG. 5.

This experiment was performed by operating the combustion apparatus of this embodiment using LPG as a fuel to determine the temperature of the exhaust gas, the temperature of the preheated air, and the internal temperature of the furnace relative to the speed of rotation of the rotary duct 44. In FIG. 5, the horizontal axis is the scale of speed of rotation of the rotary duct 44 and the vertical axis the scale of temperature.

It is clearly noted from the results of this experiment that the temperature of the exhaust gas sharply increases when the speed of rotation of the rotary duct 44 falls below 1 r.p.m. and the rate of fall of the temperature of the exhaust gas decreases when the speed of rotation rises beyond 1 r.p.m.

Here, the thermal efficiency can be found from the relation between the amount of heat introduced and the amount of heat lost from the exhaust gas as indicated by the following formula.

$$\eta = (Q - C_p \cdot G \cdot T) \cdot 100 / Q$$

wherein $\eta$: stands for thermal efficiency
Q: for thermal capacity
$C_p$: for specific heat of the exhaust gas
G: for the amount of the exhaust gas
T: for the temperature of the exhuast gas The thermal efficiency is found by applying the results of the aforementioned experiment to this formula. Take a case in which the rotation is made at a relatively high rate of 2 r.p.m., for example, the temperature of the exhaust gas which corresponds thereto is 250 C. The thermal efficiency in this case, therefore, is found as follows.

$$\eta = (25,000 - 0.32 \cdot 26 \cdot 250) \times 100 / 25,000 = 91.68(\%)$$

This indicates that the combustion furnace manifests an outstanding thermal efficiency exceeding 90%.

The excellent thermal efficiency manifested during the rotation at such a relatively high speed is logically explained by a postulate that when the speed of rotation of the rotary duct 44 is increased, the air discharged from the rotary duct 44 heavily lowers the temperature of the regeverative member and heightens more the temperature of the introduced air and, as a result, the thermal efficiency is enhanced.

The air inlet part 42 is formed by joining a basal pipe 54 to a branch pipe 55 after the pattern of the letter of inverted T. One terminal of this basal pipe 54 is closed with a lid member 56 and the other terminal thereof is attached to the supporting plate 50 of the small diameter part 44b so as to create communication with the rotary duct 44. The reference numeral "57" used in FIG. 1 stands for a flow regulating plate.

A fuel pipe 58 for supplying fuel to the burner 32 is laid along the central axis of the rotary duct 44. In the fuel pipe 58, an air pipe 59 (shown in FIG. 3) for supplying motive air (driving air) to the burner 32 is set in place. The size or sharpness of the flame radiated from the burner 32 is adjusted by controlling the amount of the motive air released from this air pipe 59. In the light of the relation between the sharpness of the flame produced with the theoretical amount of air and the loss of heat, the proper amount of the motive air is found to be approximately in the range between 2 and 5%. By adjusting the motive air, the flexibility, controllability, or versatility of the flame can be widened.

The air conduit 33, as illustrated in FIG. 3, is not extended to the terminal face of the regeverative member 37 made of a ceramic material but is formed so as to allow interposition of a gap t between itself and the ceramic regeverative member 37. This gap t may be utilized as a communicating part 60 for allowing part of the exhaust gas to bypass as indicated by the arrow of a broken line in the diagram. As a result, the amount of NOx in the exhaust gas can be adjusted because part of the exhaust gas is drawn into the air conduit 33 by suction and again consumed for combustion. The utilization of part of the exhaust gas for this consumption is facilitated by causing the combustion air to be discharged at a high speed by the use of the numerous small holes 47 formed in the end plate 48 of the rotary duct 44.

Now, the operation of the present embodiment will be described below.

The heat recovery type combustion apparatus 30 is attached to a forging furnace, the burner 32 is ignited while the motor M is kept in rotation, and a blower is operated to feed combustion air.

The flow of fuel passed through the fuel pipe 58 and spouted from the burner 32 is replenished with oxygen from the combustion air introduced through the air conduit 33 and the regeverative member 37. The flame produced by the compustion using the oxygen-enriched combustion air it stretched in the direction of the substance subjected to combustion such as, for example, ingot. As a result, the internal temperature of the forging furnace is gradnaully elevated and, after the elapse of a prescribed time, the ingot in the forging furnace are heated and softened.

In this case, the exhaust gas is passed through the regeverative member 37 and discharged out of the exhaust gas conduit 34. The regeverative member 37 is heated to a high temperature owing to the passage therethrough of the exhaust gas. When the combustion air discharged through the air conduit 33 kept in rotation is introduced into the regeverative member 37, therefore, this combustion air is heated by the regeverative member 37. This heating may well be called instantaneous heating in the sense that the combustion air is heated immediately by blowing air out of the air conduit 33 in the direction of the regeverative member 37. Thus it entails no loss of heat during the process of heating and allows efficient utility of the air heated to a high temperature. The operation of combustion by the use of this hot air proceeds in a region of very high temperature. Thus, the interval between the time the combustion is started and the time the prescribed temperature is reached becomes short. The exhaust gas after transferring the heat thereof to the regeverative member 37 is passed along the outer periphery of the air conduit 33 which is passing air of relatively low temperature and discharged from the exhaust gas conduit 34. The combustion apparatus of this embodiment, therefore, does not always find use for a smokestack.

When part of the exhaust gas flows through the communicating part 60 between the rotary duct 44 and the ceramic regeverative member 37 during the process of combustion, the amount of NOx suffered to be contained in the exhaust gas can be restrained below a prescribed level because part of the exhaust gas is admixed with the air on the air conduit 33 side and consequently consumed again in combustion. The provision of this communicating part 60 further has the advantage in that the overall configuration of the apparatus is simplified and the efficiency of apparatus assemblage is enhanced because this communicating part 60 obviates the necessity for sealing the gap between the air conduit 33 and the exhaust gas conduit 34.

FIG. 6 illustrates a combustion apparatus as another embodiment of this invention. In this embodiment, the combustion apparatus 30 is connected to a radiant tube 61. The exhaust gas is not discharged into the interior of the furnace but allowed to flow inside the radiant tube 61 and, after the substance subjected to heating has been heated solely by the heat of the ambient air, discharged out of the exhaust gas conduit 34. Since this combustion apparatus 30 is structurally identical with that of the preceding embodiment, it forms a clean system from the environmental point of view.

Figure 7:
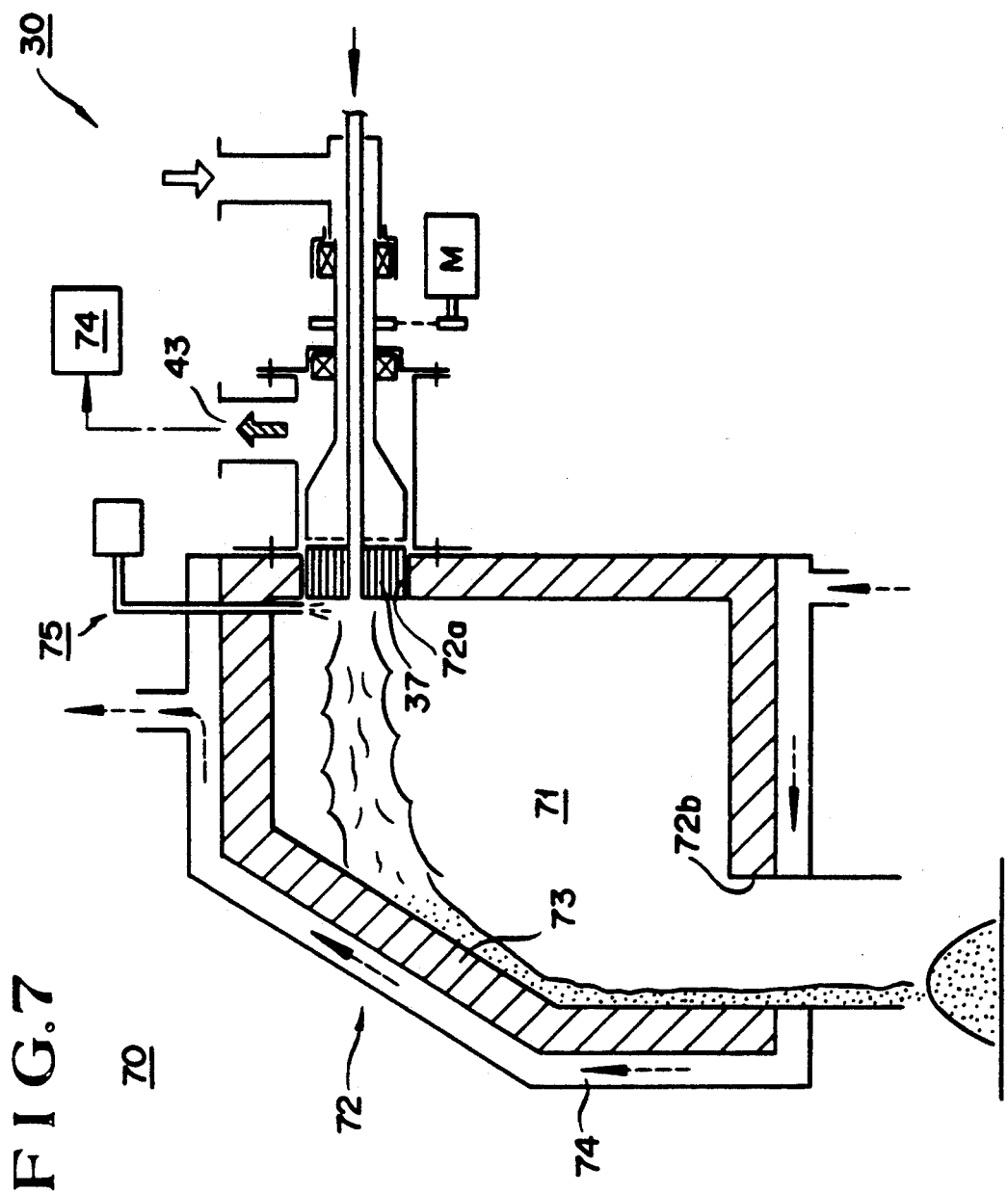
FIG. 7 is a schematic cross section illustrating yet another embodiment of this invention.

FIG. 7 illustrates a combustion apparatus as still another embodiment of this invention. This combustion apparatus is intended for use in an ash-dissolving furnace which operates by the combustion of flame retardant coarse fuel, such as CWM (Coal Water Mixture) etc., productive of ash on combustion (hereinafter referred to simply as "flame retardant fuel") and smoothly discharges dissolved ash out of the furnace proper. Generally when such a blame retardant fuel as CWM or fine coal dust which produces ash on combustion is burnt, the ash content of the fuel is melted or partly melted in the flame of high temperature and deposited on the inner wall of the furnace possibly to entail the trouble of clogging. To avoid this trouble, the practice of keeping the inner temperature of the furnace above the melting point of the ash thereby positively melting the ash and causing the ash to be discharged in the form of molten slug out of the furnace has been in vogue.

When the melting point of ash happens to be so high as to reach the neighborhood of 1,450° C., for example, the ratio of elimination of the ash is unduly low because thorough melting and depositing of the ash is not obtained with the ordinary air.

For the solution of this problem, a) a method which lowers the melting point of the ash by incorporating a melting point-lowering agent such as, for example, lime in the ash, b) a method which elevates the combustion temperature by preheating the air by the use of a heat exchanger, c) a method which elevates the combustion temperature by the use of an oxygen-enriched air, and the like are available.

The method of a) is undesirable because it not merely adds to the cost of combustion but also increases the amount of ash to be produced, the method of b) cannot be expected to effect sufficient elevation of temperature because of the limit imposed on the heat exchanger itself, and the method of c) suffers from unduly large increase in the cost of combustion because of the limit imposed on the supply of oxygen itself.

When the combustion apparatus described above is used, the elevation of the combustion temperature and the smooth discharge of the dissolved ash, from the furnace are attained without requiring use of an oxygen-enriched air.

A slag tap type ash dissolving furnace 70 illustrated in FIG. 7 is provided with a furnace body 72 having a combustion chamber 71 formed therein and the combustion apparatus 30 to be operated by the combustion of such flame retardant fuel as CWM (coal-water mixture).

The furnace body 72 is formed of a water-cooled furnace wall provided with a water pipe 74 and disposed outside a furnace wall 73 made of a castable refractory material. The furnace body 72 has an opening 72a formed at the top part of the lateral wall thereof and a slag tap hole 72b formed in the bottom wall thereof.

The combustion apparatus 30 is attached to the opening 72a. A heating device 74 such as, for example, a boiler may be attached to the outlet of the exhaust gas conduit 43 of the combustion apparatus 30 and enabled to utilize as the fuel therefor the exhaust gas discharged via the exhaust gas conduit 43. When air of an amount less than enough for complete combustion of the flame retardant fuel introduced into the furnace is used as the combustion air, the fuel is partially burnt and suffered to discharge exhaust gas containing such flammable gases as CO and H.2 in large amounts and having only low calory. This low-calory gas can be utilized again as a fuel.

When the combustion apparatus 30 is used in the ash dissolving furnace, at the time that the combustion gas generated inside the furnace is discharged through the regeverative member 37, the possibility arises that some of the molten ash will be entrained by the exhuast gas and consequently suffered to enter into the regeverative member 37, and deposited inside the regeverative member 37 to the extent of clogging it. It is, therefore, desirable to install cooling means 75 inside the furnace of the regeverative member 37 and cause the cooling means 75 to spout a low-temperature fluid such as, for example, air current to lower the temperature of the molten ash below the melting point of the ash.

In the ash dissolving furnace which utilizes the combustion apparatis 30 as described above, the combustion air of very high temperature is produced efficiently because the regeverative member 37 is heated to a high temperature by the exhaust gas produced by the combustion of the flame retardant fuel and consequently enabled to heat the combustion air. Thus, the operation of combustion which is performed with the hot air proceeds in a region of very high temperature.

Owing to the combustion which proceeds in the region of high temperature, therefore, the ash content of the flame retardant fuel is allowed to contact the inner wall of the combustion chamber 71 and deposit fast on the furnace body 73 which is cooled with the water pipe 74. At this time, the ash alone is deposited fast in the molten state on the inner wall if the fuel has been completely consumed already. If fine coat dust is still in the process of combustion and a layer of fused coal has been formed on the inner wall of the combustion chamber 71, the deposited coal layer remains intact and the combustion is completed.

In this manner, the inner wall of the combustion chamber 71 is covered with the fused coal layer and the fused coal layer gradually gains in thickness and gravitationally gathers at the bottom part of the furnace body and falls down the furnace through the slag tap holes 72b. Particularly when the ash is dissolved, the inner wall of the furnace is coated with the sodidified crust of molten ash and, as a result, the furnace itself is prevented from loss by fusion.

When the air of an amount less than enough for complete combustion of the fuel introduced into the furnace is used as the combustion air, the fuel is partially burnt and the exhaust gas discharged through the exhaust gas conduit 43 has virtually no ash content in spite of fairly high temperature and contains such flammable gases as CO and H$_2$ in large amounts and possesses low calory. When this exhaust gas is supplied to a heating device such as a boiler, it can be used as a gaseous fuel. Thus, even an ash-containing flame retardant fuel can be converted into an easily handlable gaseous fuel which can be utilized efficiently.

Figure 8:
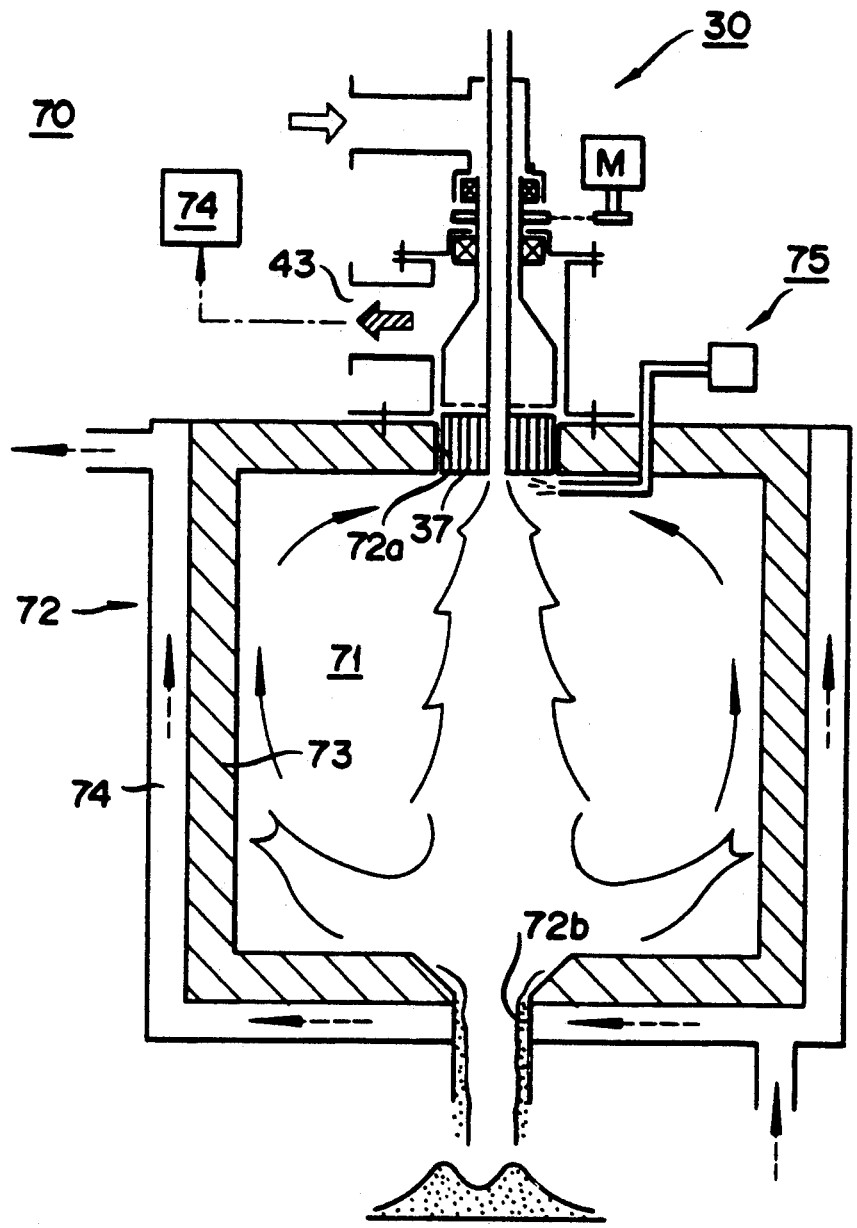
FIG. 8 is a schematic cross section illustrating a further embodiment of this invention.
Figure 9:
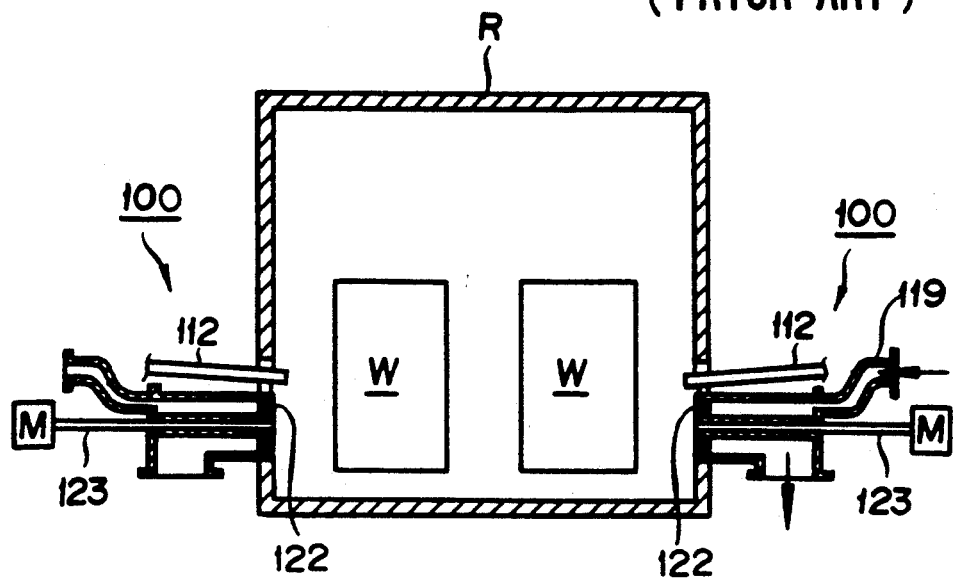
FIG. 9 is a schematic cross section illustrating a conventional combustion apparatus.
Figure 10:
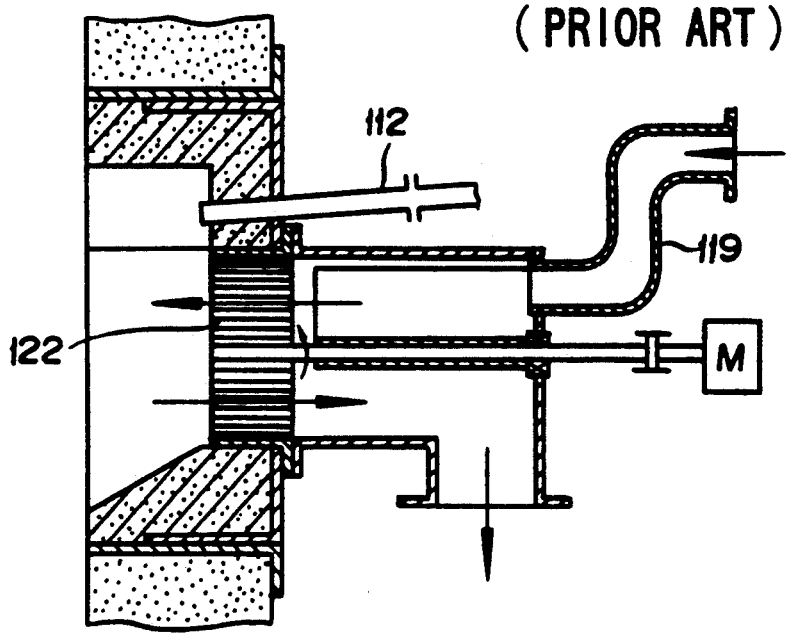
FIG. 10 is a magnified cross section of the essential part of the apparatus of FIG. 9.

The combustion apparatus 30 described above may be configured in a vertical type as illustrated in FIG. 8 and attached to the top part of the furnace body 72, with a slag tap hole 72b formed at the center of the bottom wall of the furnace body 72.

This invention can be embodied not only in such furnaces as forging furnaces and ash-dissolving furnaces which have been described above but also in various devices intended for application of heat such as drying devices and steam-generating devices represented by turbines. While the embodiments cited thus far represent cases in which air conduits 33 and exhaust gas conduits 34 are formed two each by partitioning the interior of a rotary duct 44, this invention allows formation of a multiplicity of air conduits and exhaust gas conduits. Though the rotary duct 44 has been depicted as being provided at the center thereof with an air duct for supplying motive air, the apparatus of this invention does not always find use for this air duct.

I claim:

1. A heat recovery type combustion apparatus comprising a main body, a burner for heating a substance held inside said main body of said combustion apparatus and subjected to heating, an air conduit adapted to allow flow of combustion air in the interior thereof and laid in the proximity of said burner, an exhaust gas conduit for discharging exhaust gas arising from combustion from the main body of said combustion apparatus, and a heat-exchange member capable of utilizing the heat of said exhaust gas for heating said combustion air flowing through said air conduit, which combustion apparatus is characterized in that said heat-exchange member is formed of an air-pervious regeverative member made of a ceramic substance, said regeverative member is attached to the lateral wall of the main body of said combustion apparatus, a rotary duct is set in place inside said main body case disposed so as to communicate with said regeverative member, said air conduit and exhaust gas conduit are formed independently of each other throughout the entire length from the inlet to the outlet thereof inside said rotary duct, a fuel pipe for supplying fuel to said burner installed substantially at the central position of said regeverative member is laid as thrust through said rotary duct, and said rotary duct is rotated by rotary means and enabled to cause said combustion air to flow along said air conduit through said regeverative member into said main body of combustion apparatus and said exhaust gas to flow through the interior of said regeverative member and along said exhaust gas conduit.

2. A heat recovery type combustion apparatus according to claim 1, wherein said rotary duct is adapted so that said air conduit and said exhaust gas conduit are alternately positioned in the circumferential direction.

3. A heat recovery type combustion apparatus according to claim 1 or claim 2, wherein said air conduit has the leading terminal thereof closed with an end plate containing a multiplicity of small holes.

4. A heat recovery type combustion apparatus according to claim 3, wherein said rotary duct has a prescribed gap interposed between itself and said regeverative member so as to form a communicating part for allowing flow of said exhaust gas into the interior of said air conduit.

5. A heat recovery type combustion apparatus according to claim 4, wherein said fuel pipe is provided at the center thereof with an air pipe for supply of motive air.

6. A heat recovery type combustion apparatus according to claim 1, wherein the main body thereof is a furnace body of an ash dissolving furnace.

7. A heat recovery type combustion apparatus according to claim 6, wherein said main body of combustion apparatus is provided with cooling means for spouting a fluid of relatively low temperature in the form of film on the furnace body side terminal surface of said regeverative member.

8. A heat recovery type combustion apparatus according to claim 2 wherein said rotary duct has a prescribed gap interposed between itself and said regenerative member so as to form a communicating part for allowing flow of said exhaust gas into the interior of said air conduit.

9. A heat recovery type combustion apparatus according to claim 1 wherein said rotary duct has a prescribed gap interposed between itself and said regenerative member so as to form a communicating part for allowing flow of said exhaust gas into the interior of said air conduit.

10. A heat recovery type combustion apparatus according to claim 3 wherein said fuel pipe is provided at the center thereof with an air pipe for supply of motive air.

11. A heat recovery type combustion apparatus according to claim 2 wherein said fuel pipe is provided at the center thereof with an air pipe for supply of motive air.

12. A heat recovery type combustion apparatus according to claim 1 wherein said fuel pipe is provided at the center thereof with an air pipe for supply of motive air.

* * * * *